United States Patent [19]
Barthelme

[11] 4,317,209
[45] Feb. 23, 1982

[54] FSK TONE GENERATOR CIRCUIT

[75] Inventor: Julius A. Barthelme, Woodsboro, Md.

[73] Assignee: Frederick Electronics Corp., Frederick, Md.

[21] Appl. No.: 100,057

[22] Filed: Dec. 4, 1979

[51] Int. Cl.³ .................... H04L 27/12; H04J 1/00
[52] U.S. Cl. ........................... 375/62; 375/65; 370/76; 328/27
[58] Field of Search ............. 370/76, 69; 179/84 VF; 328/27, 15; 307/261; 375/45, 47, 62, 65

[56] References Cited

U.S. PATENT DOCUMENTS

| | | | |
|---|---|---|---|
| 3,668,562 | 6/1972 | Fritkin | 375/62 |
| 3,932,704 | 1/1976 | Bodony | 375/65 |
| 3,997,855 | 12/1976 | Nash | 375/62 |
| 4,160,121 | 7/1979 | Kaufman | 375/65 |

Primary Examiner—Douglas W. Olms
Attorney, Agent, or Firm—Arnold, White & Durkee

[57] ABSTRACT

A tone generator circuit used in a frequency shift keying (FSK) channel in a frequency division multiplexing (FDM) system is disclosed. Each frequency shift between the mark and space tone frequencies is programmed to generate a sequence of discrete intermediate frequencies according to a sinusoidal modulation waveform to produce transmitted tone signals having minimum sideband energy and minimum distortion. A modulation clock generator produces a predetermined number of clock cycles per bit time of the baud rate of the channel. The modulation clock is used to produce a sequence of address signals used to address a PROM containing a set of multiplying code words. Each code word represents a different output tone frequency. The code words are used in a binary rate multiplier to multiply a crystal controlled clock signal by the decimal equivalent of the binary code word. The multiplied digital frequency signal is also divided by fixed division factors to produce an output digital tone signal. This digital tone signal is passed through a bandpass filter to remove the sideband noise and thereby produce a sinusoidal output tone signal.

28 Claims, 3 Drawing Figures

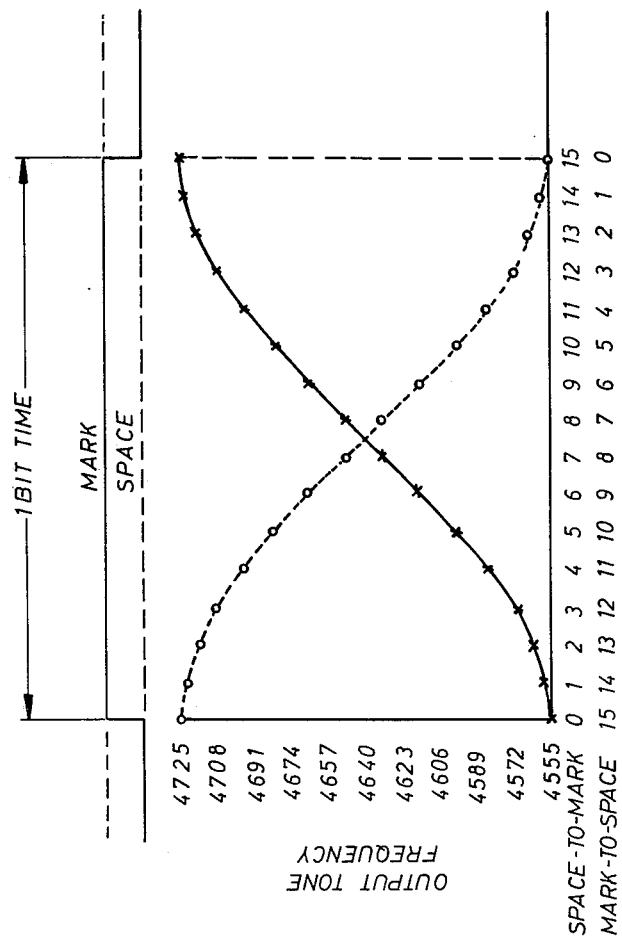

FSK TONE GENERATOR CIRCUIT

BACKGROUND OF THE INVENTION

This invention relates to multi-channel frequency division multiplexing (FDM) systems. More particularly, this invention relates to a circuit for generating the frequency shift tones in the frequency shift keying (FSK) data channels used in the FDM system.

FSK data channels transmit data over a communication link as a serial stream of digital data bits where the data bits are referred to as marks (1's) and spaces (0's). Each mark and space is transmitted as a different sinusoidal tone signal. Each FSK data channel will be operating at a baud rate, with each baud of information comprising a integer number of sequential digital data bits. Each data bit will be transmitted during a bit time. In frequency division mutliplexing (FDM) systems, the data channels of FSK information are located at different frequencies within a single bandwidth of one communication link. Usually this communication link is limited to a 3 kilohertz (3 KHz) bandwidth. As a result, the frequency shift (mark-to-space) and vice versa) of the FSK signals for each channel must be a narrow shift in order that the total number of data channels can fit in the total bandwidth available. For a 16-channel FDM system transmitting at a 200 baud rate, a frequency shift of only 170 Hz may be permitted. For a 75 baud rate, only a 60 Hz shift may be permitted.

In the past, it has been a common technique of switching the tone signals for a mark-to-space or space-to-mark transition instantaneously. Unfortunately, this type of frequency shift produces undesirable sideband energy. In addition to an instantaneous frequency shift, other prior-art devices have used such techniques as voltage-controlled oscillators, dual precision reference sources, or a single precision reference source plus programmable dividers. Although the voltage-controlled oscillator approach allows true frequency shift tone generation, it suffers from two distinct disadvantages—lack of frequency accuracy, and the abrupt shift from mark-to-space and vice versa. The latter disadvantage also is a problem present in the precision reference system.

To overcome the abrupt frequency shift problem of generating unwanted sideband energy, prior-art systems, such as that disclosed in U.S. Pat. No. 3,997,855, have attempted to avoid the abrupt change in frequency during a frequency shift by programming a divide-by-N counter to divide a crystal based reference frequency during a frequency shift to generate discrete intermediate frequencies between the mark and space tones. The selection of the intermediate frequencies generated is controlled by the modulation waveform selected. To minimize the amount of sideband energy generated, a sinusoidal modulation wavefore is required.

U.S. Pat. No. 3,997,855 has attempted to achieve a sinusoidal modulation of the frequency shift by the use of a divide-by-N counter, programmed to generate a sequence of division factors N during the first half of each bit time where a frequency shift is to occur. However, for this prior-art tone generator circuit, the resolution in the frequency of the output tone signal generated varies with the value of N. This is a direct result of the fact that the generated frequency is a function of the inverse of N. A further consequence of the use of a divide-by-N counter approach is the inability of the tone generator circuit to precisely produce all of the CCIR and CCITT FSK tone signals from a single crystal reference signal. This inability to exactly produce the required frequencies results in distortion at the receiving end.

For frequency shifts that are large in magnitude, the need to resolve with a high degree of resolution each of the desired intermediate frequencies for a sinusoidal modulation is less critical. With large frequency shifts, the difference between distortion resulting from some inaccuracies in resolution of the intermediate frequencies and an ideal sinusoidal resolution is not as significant as where small frequency shifts are used. That is, errors in the generation of the exact intermediate frequencies for large frequency shifts do not appear as a significant distortion at the receiving end of the data link. However, where frequency shifts are small, the ability to accurately generate the desired frequencies becomes of great importance. This is true because the same resolution errors present in a tone generator circuit such as '885 for small frequency shifts would result in significant distortion errors at the receiving end. In addition, because the resolution in frequency by a divide-by-N counter varies as a function of N, the sideband noise generated during a frequency shift is not symmetrical. Nonsymmetry in the generation of the sideband noise appears as distortion in the received waveforms where filters are used to remove the sideband energy.

Accordingly, it would be advantageous to provide a frequency tone generator circuit that is able to generate, during a frequency shift, each intermediate tone frequency with the same resolution throughout the shift. It would also be advantageous to provide a tone generator circuit that can resolve each intermediate frequency with a degree of resolution that will produce an accurate approximation to a pure sinusoidal modulation of the frequencies where small frequency shifts are present. Further, it would be advantageous to provide a tone generator circuit that produces symmetrical sideband energy to minimize the distortion introduced by the use of a bandpass filter to filter this sideband energy.

SUMMARY OF THE INVENTION

In accordance with this invention, a tone generator circuit for use in a frequency shift keying channel in a multi-channel frequency division multiplexing system is disclosed. The tone generator circuit generates a predetermined sequence of sinusoidal tone signals from a single digital crystal reference clock during a frequency shift between the mark and space tone frequencies. The tone generator circuit shifts between the mark and space tone signals in response to a frequency shift keying command.

A modulation clock generator is provided to generate a modulation clock signal from the reference clock such that the modulation clock will have a predetermined number of clock cycles per bit time of the frequency shift keying channel baud rate. The modulation clock signal is produced by multiplying the crystal-controlled clock reference signal by a coded multiplication word in a binary rate multiplier. The binary rate multiplier is programmed by a set of programmable switches to produce the multiplication code word that will result in the desired modulation clock frequency. In addition to multiplying the reference frequency, the binary rate multiplier also divides the referenced clock by a predetermined divide constant. This reduces the frequency out of the rate multiplier to something less than the reference clock frequency. A divider counter is also provided to further divide the output of the binary rate multiplier and produce the modulation clock signal.

A multiplying code generator, responsive to the modulation clock signal, is provided to produce a sequence of multiplying code words that are used to multiply the reference clock to produce the desired output tone frequencies for the FSK channel. The multiplying code generator consists of an up/down counter that responds to the modulation clock signal to generate a sequence of digital address signals. These address signals are inputted to a programmable read-only memory that contains the multiplying code words. The sequence of address signals produced by the up/down counter, in turn, produces a sequence of multiplying code words on the output of the read-only memory.

These multiplying code words are then inputted to a second binary rate multiplier which multiplies the reference clock by the code words to produce the desired digital tone signal. This binary rate multiplier also divides the reference clock by a fixed value. A second divider counter responds to the output of the rate multiplier to produce a digital tone signal that is then inputted into a bandpass filter. The bandpass filter filters the noise and the harmonic sideband frequencies from the digital tone signals to produce the desired sinusoidal tone signals.

BRIEF DESCRIPTION OF THE DRAWINGS

For a fuller understanding of the present invention, reference should be had to the following detailed description taken in connection with the accompanying drawings, in which:

FIG. 2 is a plot of the intermediate frequencies generated during a frequency shift for one bit time for a typical baud rate and a particular frequency span of a FSK data channel; and FIG. 3 is a table of the digital multiplying code words produced by the tone generator circuit of FIG. 1 that generates the output tone frequencies illustrated in FIG. 2.

Similar reference characters refer to similar parts throughout the several views of the drawings.

DETAILED DESCRIPTION OF THE PREFERRED EMBODIMENT

Figure 1:
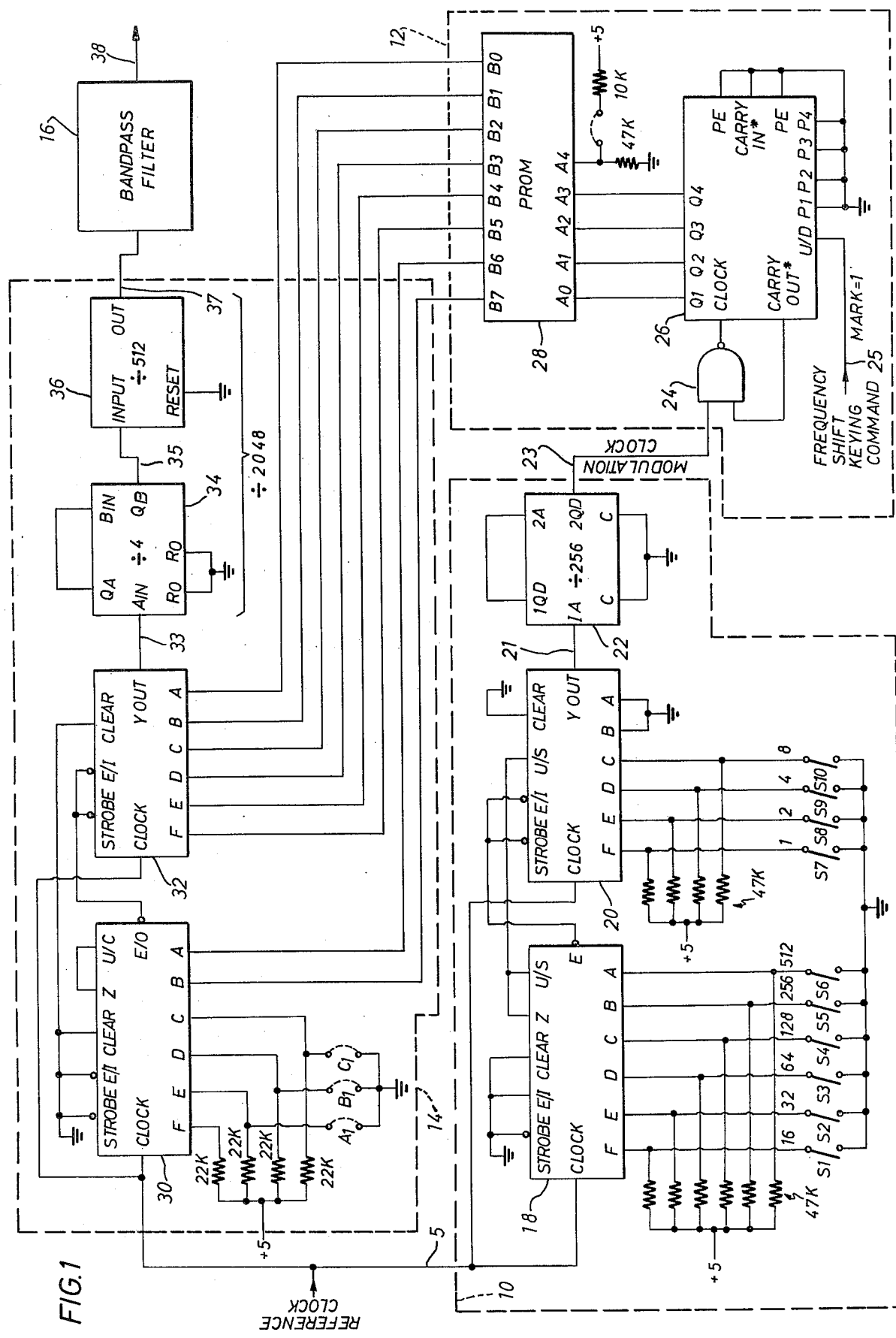
FIG. 1 is a circuit diagram of the tone generator circuits of the present invention which produces a sequence of intermediate tone signals during a frequency shift.

Referring to the figures and first to FIG. 1, a circuit diagram of the tone generator of the present invention is shown. The tone generator circuit comprises a modulation clock generator 10, a multiplying code generator 12, a multiplying means 14 and a bandpass filter 16. A reference clock signal 5 is shown inputted to the multiplying means 14 and the modulation clock generator 10. The reference clock 5 is a single time base from which all of the desired tone signals will be generated. For the preferred embodiment of the present invention, the reference clock signal is a 10.48576 MHz crystal-controlled oscillator clock signal. The modulation clock generator 10 responds to the reference clock 5 to produce a modulation clock signal on line 23. The modulation clock 23 is applied to the multiplying code generator 12 to produce a series of multiplying code words that are inputted to the multiplying means 14. These multiplying code words are used by the multiplying means 14 to produce a digital tone signal 37. The digital tone signal 37 is then applied to a bandpass filter 16 to remove the harmonic sideband energy and the noise in the digital tone signal to produce a sinusoidal tone signal 38 that is used as the data channel tone signal.

The modulation clock generator 10 consists of two serially connected binary rate multiplier units 18 and 20. Each of these binary rate multiplier units respond to an input multiplying code word to produce an output frequency signal that is the results of the multiplication of the input clock signal by an input multiplication code word divided by a fixed integer value. In other words, a binary rate multiplier forms the product of $N/K \cdot f_r$, where N is the decimal equivalent of the binary multiplication code word, K is the integer divide constant and $f_r$ is the input frequency clock signal.

For the preferred embodiment of the present invention, each of the binary rate multiplier units 18 and 20 are integrated circuit chips manufactured by Texas Instruments as IC number SN7497N. This particular device multiplies the incoming clock signal by a factor of N/64, where N is the decimal equivalent of a 6-bit digital input multiplying code word. As a result, each binary rate multiplier unit 18 and 20 can produce an output frequency that varies from 1/64th of the input clock frequency to 63/64 of the input clock frequency. By serially connecting two dividers, a digital multiplication factor is produced in which the incoming input frequency clock signal is divided by 4096 and multiplied by the decimal equivalent of a 12-bit binary multiplication code word. In the preferred embodiment, the multiplication code word which selects the modulation clock frequency to be generated by the modulation clock generator 10 is supplied by a series of switches S1-S10. As seen in FIG. 1, S7-S10 has the decimal equivalent weighting of 1, 2, 4 and 8, respectively, while switches S1-S6 have the decimal weighting of 16, 32, 64, 128, 256, and 512, respectively.

The incoming reference clock signal 5 is divided by the binary rate multiplier units 18 and 20 to produce the digital clock signal 21 that is further divided by a factor of 256 in divide counter 22. For the preferred embodiment of the present invention, a reference clock frequency of 10.48576 MHz will produce a modulation clock frequency that changes 40 Hz for each count in the encoded multiplication code word produced by the switches S1-S10. The frequency of the modulation clock signal 23 is selected to produce a predetermined number of clock cycles for each bit time of the output baud rate of the FSK data channel. For best results in the preferred embodiment, a modulation clock frequency 23 having 16 to 20 cycles per bit time is preferred. When the modulation clock 23 lies within this range, the frequency shift between the mark and space tones will take approximately one bit time to occur. This is true because the multiplying code generator 12 generates 16 multiplying code words during a frequency shift. It will be obvious to a person of ordinary skill in the art that more multiplying code words could be generated during a frequency shift by simply increasing the storage capacity of the multiplying code generator 12 and increasing the modulation clock frequency 23. Also, the modulation clock frequency 23 could be increased to produce a frequency shift which occurs in a time interval that is less than 1-bit time.

Still referring to FIG. 1, the modulation clock signal 23 is inputted to the multiplying code generator 12 which consists of an up/down counter 26 whose output is connected to a PROM 28. The up/down counter 26 responds to the modulation clock 23 through a 2-input NAND gate 24 whose output is the clocking signal to the counter 26. The CARRY OUT* of counter 26 is inputted to NAND gate 24 as a disabling signal to remove the application of the modulation clock 23 to the up/down counter 26 when either the full maximum (all 1's) or the minimum count (all 0's) is attained. In this manner, the up/down counter 26 will either count up from all 0's or will count down from all 1's when the logic level of the frequency shift keying command 25 is changed at the U/D input of counter 26. The logic level of the shift command 25 is changed when a frequency shift is to occur. The output of up/down counter 26 is a 4-bit address word that is applied to PROM 28. For the preferred embodiment, PROM 28 is a 32 word memory unit in which each word is 8 bits long. Accordingly, PROM 28 outputs an 8-bit multiplying code word for each address inputted from up/down counter 26. Only 16 of the addressable PROM 28 locations are used to store the multiplication code words that are used to generate the sequence of code words during a frequency shift.

Referring now to FIG. 3, a table of the binary values of the multiplying code words outputted by PROM 28 is shown opposite the address generated by the up/down counter 26. Also shown are the output tone frequencies generated by the present invention opposite to the multiplying code word applied to the multiplying means 14. The frequencies shown are for a 170 Hz frequency shift for a FSK data channel operating at a 200 baud rate. The following is the equation from which the frequencies shown in FIG. 3 are calculated. For the preferred embodiment, each bit time has been divided into equal increments of time. To produce a sinwave modulation that will generate symmetrical sideband energy, any inaccuracies in the generation of the exact frequencies desired must be symmetrical about the center frequency between the mark and space tone frequencies. Regardless of the resolution of each frequency by the tone generator circuit, as long as the resolution is the same for each frequency and the frequency shift time is divided into equal time increments, the sideband energy will be symmetrical.

The equation is:

$$f_i = f_{min} + (\sin^2(90°/L \cdot M) \cdot (f_{max} - f_{min}),$$

where $f_i$ is the intermediate frequency, $f_{max}$ is the maximum frequency to be generated, $f_{min}$ is the minimum frequency to be generated, L is the total number of increments of time in the frequency shift and M is the individual time interval number within the frequency shift. For the example shown in FIG. 3, the equation reduces to:

$$f_i = 4555 + 170 \cdot \sin^2(6 \cdot M).$$

Referring again to FIG. 1, the multiplying code words from PROM 28 are inputted along with the reference clock 5 to the multiplying means 14. The multiplying code words are inputted to a serially connected pair of binary rate multiplier units 30 and 32. As previously discussed with reference to the modulation clock generator 10, the binary rate multiplier units 30 and 32 operate in the same manner as the binary rate multiplier units 18 and 20. That is, the input reference clock 5 is multiplied by the factor N/4096, wherein N is the decimal equivalent of the binary multiplication code word outputted by PROM 28. The results of this multiplication, outputted by multiplier unit 32, is further divided in a divide counter consisting of serially connected binary counters 34 and 36. Binary counter 34 divides the output digital signal from binary multiplier unit 32 by a factor of 16, while counter 36 divides the output of counter 34 by a factor of 128 to produce a total division factor for the two counters of 2048. The output of counter 36 is a digital tone signal whose frequency corresponds to the desired frequency to be generated. As a result, in the preferred embodiment, each count of the multiplying code word is the equivalent of a 1.25 Hz increment in the digital tone signal generated.

This digital tone signal is inputted to a bandpass filter 16 which filters the harmonic content and the noise of the digital tone signal to produce on its output a sinusoidal signal 38. For the preferred embodiment of the present invention, filter 16 is a 3-pole pair, stagger tuned bandpass filter. Because the present invention produces to a high degree of accuracy and resolution each of the desired frequencies for a sinusoidal modulation of the intermediate frequencies during a frequency shift, the bandpass filter 16 does not have to be as sharp to eliminate the sideband energy as it would if there were more sideband energy due to errors in the frequencies. With a broader bandpass filter, the differential delay between the delay for the mark and the space tone frequencies is significantly reduced. This reduced differential delay results in less distortion in the received signals. The sinusoidal tone signal 38 is available to be used directly as the tone signal to be transmitted, or it may be mixed with a second variable frequency (not shown but generated in a manner similar to the modulation clock and the digital tone signal) to produce the signal eventually transmitted. When mixing is used, a sum and difference frequency is produced. For the preferred embodiment, these resulting mixer frequencies will then have a resolution of 2.5 Hz for a resolution of 1.25 Hz on the input frequency that was mixed.

Referring now to FIG. 2, a plot of the intermediate discrete frequencies generated during a space-to-mark or a mark-to-space transition is shown plotted as a function of the count of the up/down counter 26. The frequency shift is shown as being generated during 1 bit time of the output baud rate of the data channel, i.e., the modulation clock 23 has 16 cycles per bit time. As shown in FIG. 2, the mark-to-space transition is the dotted curve while the space-to-mark transition is the solid curve. FIG. 3 as mentioned previously, illustrates the multiplying code words that are used to produce the output tone frequencies plotted in FIG. 2 for each of the up/down counter 26 counts. The output tone frequencies plotted in FIG. 2 represent a true sinusoidal modulation waveform for the frequencies generated during a frequency shift.

The following table is a list of the manufacture and IC type number of the various IC circuit references as shown in FIG. 1.

| TABLE OF INTEGRATED CIRCUIT UNITS | | |
|---|---|---|
| Circuit Reference | IC Number | Manufacture |
| 18, 20, 30, 32 | SN7497N | Texas Inst. |
| 22 | SN74LS393 | Texas Inst. |
| 26 | CD4516B | RCA |
| 28 | 82S123 | Signetics |
| 34 | SN74LS93 | Texas Inst. |

| TABLE OF INTEGRATED CIRCUIT UNITS | | |
| --- | --- | --- |
| Circuit Reference | IC Number | Manufacture |
| 36 | CD4024BC | RCA |

The foregoing description of the invention has been directed to a particular preferred embodiment in accordance with the requirements of the Patent Statutes, and for purposes of explanation and illustration. It will be apparent, however, to those skilled in this art that many modifications and changes may be made in the circuit without departing from the scope and spirit of the invention. For example, the number of intermediate frequencies generated during a bit time may be varied, the frequency shift may occur in a time interval less than 1-bit time, the bandpass filter 16 may be replaced by an alternate means of converting the digital tone signal into a sinusoidal waveform for transmission, such as a digital approximation to a sinewave, etc. These, and other modifications of the invention will be apparent to those skilled in this art. It is the applicant's intention in the following claims to cover all such equivalent modifications and variations as fall within the true spirit and scope of the invention.

What is claimed is:

1. A tone generator circuit, for use in a frequency shift keying channel in a multi-channel frequency division multiplexing (FDM) system, the circuit generating sinusoidal tone signals from a digital reference clock in which one tone signal represents a mark and another tone signal represents a space, and in which predetermined sequences of discrete tone frequencies are generated during frequency shifts during mark-to-space and space-to-mark transitions in response to a frequency shift keying command, the channel handling bits of data as a series of marks and spaces with each bit transmitted during a predetermined bit time, the tone generator circuit comprising:
    (a) a modulation clock generator, for generating a modulation clock signal which has a predetermined number of clock cycles per bit time of the frequency shift keying channel;
    (b) a multiplying code generator responsive to the keying command and the modulation clock signal, for generating a sequence of multiplying code words, each code word representing a discrete tone frequency;
    (c) a multiplying means responsive to the reference clock and the multiplying code words, for multiplying the reference clock according to the multiplying code words to produce digital tone signals; said multiplying code generator and said multiplying means cooperating together to generate symmetrical sequences of digital tone signals between the sequence of digital tone signals generated during a mark-to-space transition and the sequence of digital tone signals generated during a space-to-mark transition, and where the magnitude of the frequency change between adjacent tone signals in a frequency shift sequence being equal to a predetermined number of increments in frequency where one increment in frequency is equal to the frequency change in tone signals for a one count change in the multiplying code words; and
    (d) a filter responsive to the digital tone signals, for filtering the noise and harmonic frequencies of each digital tone signal to produce a sinusoidal tone signal.

2. The circuit of claim 1 wherein said modulation clock generator comprises:
    (a) a set of programmable switches, each said switch generating a digital logic signal, the resulting set of logic signals forming a multiplication code word;
    (b) a binary rate multiplier responsive to the reference clock signal and the multiplication code word, for multiplying the reference clock by the multiplication code word, and for dividing the reference clock by a first predetermined divide constant; and
    (c) a divider counter for generating the modulation clock signal by dividing the output from the rate multiplier by a second predetermined divide constant.

3. The circuit of claim 2 wherein the predetermined number of clock cycles per bit time is within the range of 16 to 20.

4. The circuit of claim 1 wherein said multiplying code generator includes:
    (a) an up/down counter responsive to the modulation clock signal, for generating a sequence of digital address signals;
    (b) a disabling means responsive to said up/down counter, for disabling the application of the modulation clock to said up/down counter when said up/down counter has reached either a first upper count or a second lower count; and
    (c) a memory unit responsive to the digital address signals from said up/down counter, for storing and outputting the multiplying code words corresponding to the output tone frequency signals, the sequence of address signals from said up/down counter producing the sequence of multiplying code words on the output of said memory.

5. The circuit of claim 4 wherein said memory unit is a programmable read-only memory.

6. The circuit of claim 4 wherein said disabling means is a two input AND gate.

7. The circuit of claim 1 or 4 wherein the sequence of multiplying code words produces a sinusoidal modulation of the sinusoidal tone signals during a frequency shift.

8. The circuit of claim 1 wherein said multiplying means comprises:
    (a) a binary rate multiplier responsive to the reference clock signal for multiplying the reference clock by the multiplying code word, and for dividing the reference clock by a first predetermined divide constant; and
    (b) a second divider counter responsive to the output of said rate multiplier, for dividing the rate multiplier output signal by a second predetermined divide constant, said divide counter outputting the digital tone signal.

9. The circuit of claim 2 or 8 wherein the first predetermined divide constant is 4096.

10. The circuit of claim 2 wherein the second predetermined divide constant is 256.

11. The circuit of claim 8 wherein said second predetermined divide constant is 2048.

12. The circuit of claim 1 wherein said filter means is a bandpass filter.

13. A tone generator circuit for use in a frequency shift keying channel in which bits of data are transmitted as a series of marks and spaces, each bit transmitted during a predetermined bit time, and where the marks and spaces are represented by two different sinusoidal tone frequencies, said keying unit having a reference clock signal, the tone generator circuit comprising:

(a) a set of programmable switches, each said switch generating a digital logic signal, the resulting set of logic signals forming a multiplication code word;

(b) a first binary rate multiplier responsive to the reference clock signal and the multiplication code word, for multiplying the reference clock by the multiplication code word, and for dividing the reference clock by a first predetermined divide constant;

(c) a first divider counter, for generating a modulation clock signal by dividing the output from the rate multiplier by a second predetermined divide constant, the modulation clock signal having a predetermined number of clock cycles per bit time;

(d) an up/down counter responsive to the modulation clock signal, for generating a sequence of digital address signals;

(e) a disabling means responsive to said up/down counter, for disabling the application of the modulation clock to said up/down counter when said up/down counter has reached either a first upper count or a second lower count;

(f) a memory unit responsive to the digital address signals from said up/down counter, for storing and outputting multiplying code words, each code word corresponding to one sinusoidal tone frequency signal, the sequence of address signals from said up/down counter producing a sequence of multiplying code words on the output of said memory;

(g) a second binary rate multiplier responsive to the reference clock signal for multiplying the reference clock by the multiplying code words, and for dividing the reference clock by a third predetermined divide constant;

(h) a second divider counter responsive to the output of said second binary rate multiplier, for dividing the second rate multiplier output signal by a fourth predetermined divide constant, said second divide counter outputting a digital tone signal; and (i) a filter responsive to the digital tone signals, for filtering the noise and harmonic frequencies of the digital tone signal to produce the sinusoidal tone signals.

14. The circuit of claim 13 wherein the predetermined number of clock cycles per bit time is within the range of 16 to 20.

15. The circuit of claim 13 wherein said memory unit is a programmable read-only memory.

16. The circuit of claim 13 wherein the sequence of multiplying frequency code words produces a sinusoidal modulation of the sinusoidal tone signals during a frequency shift.

17. The circuit of claim 13 wherein the first and third predetermined divide constants are 4096.

18. The circuit of claim 13 wherein the second predetermined divide constant is 256.

19. The circuit of claim 13 wherein said fourth predetermined divide constant is 2048.

20. The circuit of claim 13 wherein said filter means is a bandpass filter.

21. A tone generator circuit for use in a frequency shift keying unit in which bits of data are transmitted as a series of marks and spaces, each bit transmitted during a predetermined bit time, and where the marks and spaces are represented by two different sinusoidal tone frequencies, said keying unit having a reference clock signal, the tone generator circuit generating a predetermined sequence of discrete intermediate tone frequencies during the frequency shifts for mark-to-space and space-to-mark transitions, the circuit comprising:

(a) a frequency code generator, for generating a sequence of digital code words, each code word having a least significant bit (LSB), and each code word representing a tone frequency to be generated;

(b) a multiplier responsive to the code words and the reference clock signal, for generating the tone frequencies, said multiplier cooperating with the sequence of code words to generate symmetrical sequences of discrete intermediate tone frequencies in the sequences of the markspace frequency shifts, and where changes in the intermediate frequencies are in increments of frequency with one increment equal in magnitude to the change in tone frequency resulting from a change in only the LSB of a code word; and (c) a filter, for converting the digital tone frequency signals into sinusoidal tone frequencies.

22. The circuit of claim 21 wherein said frequency code generator includes:

(a) a clock generator, for generating an address clock signal during a frequency shift sequence;

(b) a memory for storing and outputting the code words; and (c) an address generator responsive to the address clock, for generating a sequence of digital address signals, said memory outputting the sequence of code words in response thereto.

23. The circuit of claim 22 wherein said address generator is an up/down counter which includes means for disabling the sequence of addresses whenever a mark-to-space or a space-to-mark frequency shift is completed.

24. The circuit of claim 22 wherein said memory is a read-only-memory.

25. The circuit of claim 21 or 22 wherein the sequence of multiplying code words produces a sinusoidal modulation of the sinusoidal tone signals during a frequency shift.

26. The circuit of claim 22 wherein a frequency shift occurs in one bit time and said clock generator generates a predetermined number of address clock cycles per bit time.

27. The circuit of claim 26 wherein the predetermined number of address clock cycles per bit time in within the range of 16 to 20.

28. The circuit of claim 21 wherein said multiplier is a binary rate multiplier.

* * * * *